T. BIRD.
COMBINATION WATER AND WEIGHT POWER MACHINE.
APPLICATION FILED AUG. 4, 1917.
1,264,759.
Patented Apr. 30, 1918.
4 SHEETS—SHEET 2.
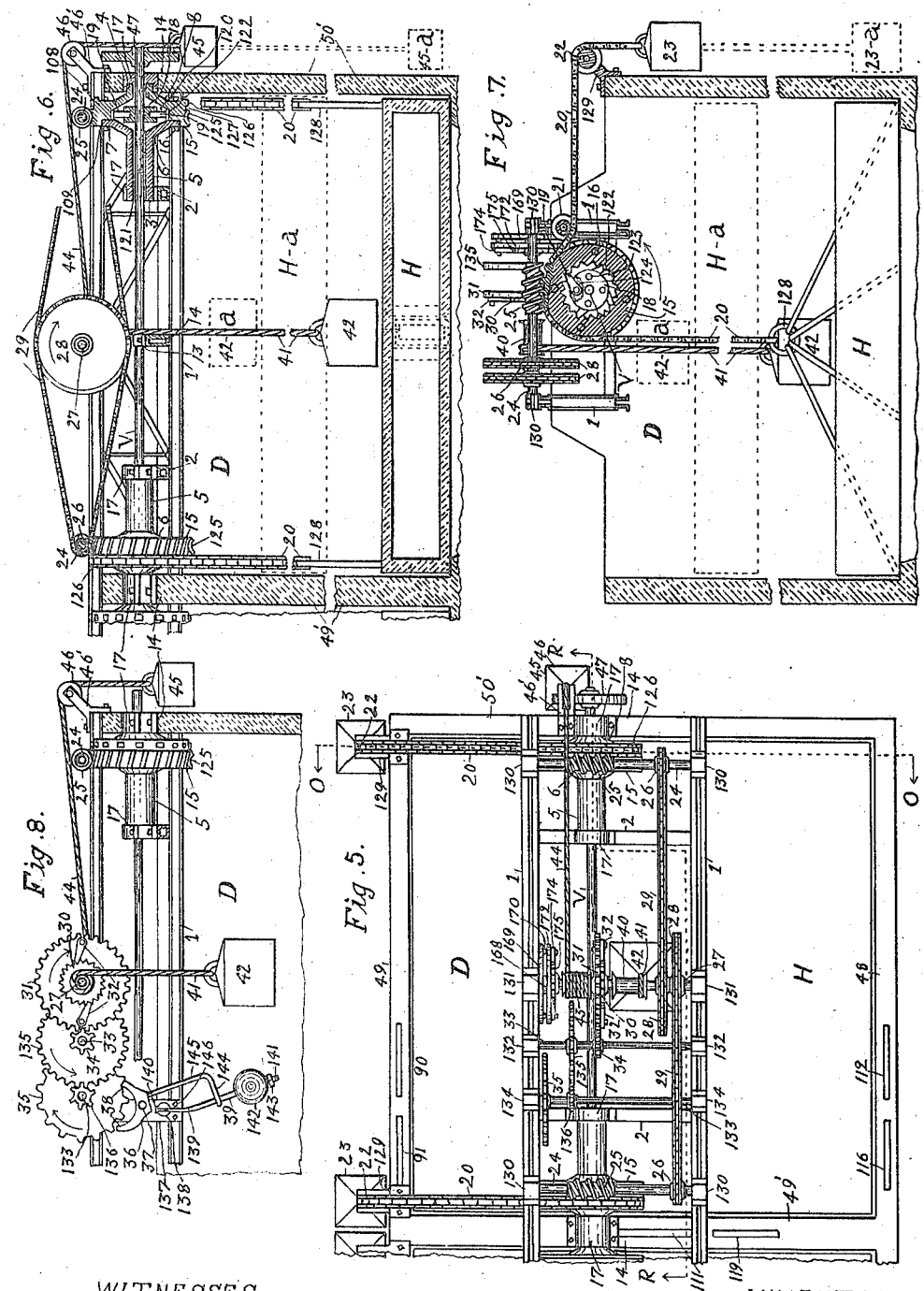
WITNESSES
John A. Morris
Melker Rudholm
INVENTOR
Thomas Bird
BY
James R. Townsend
ATTORNEY

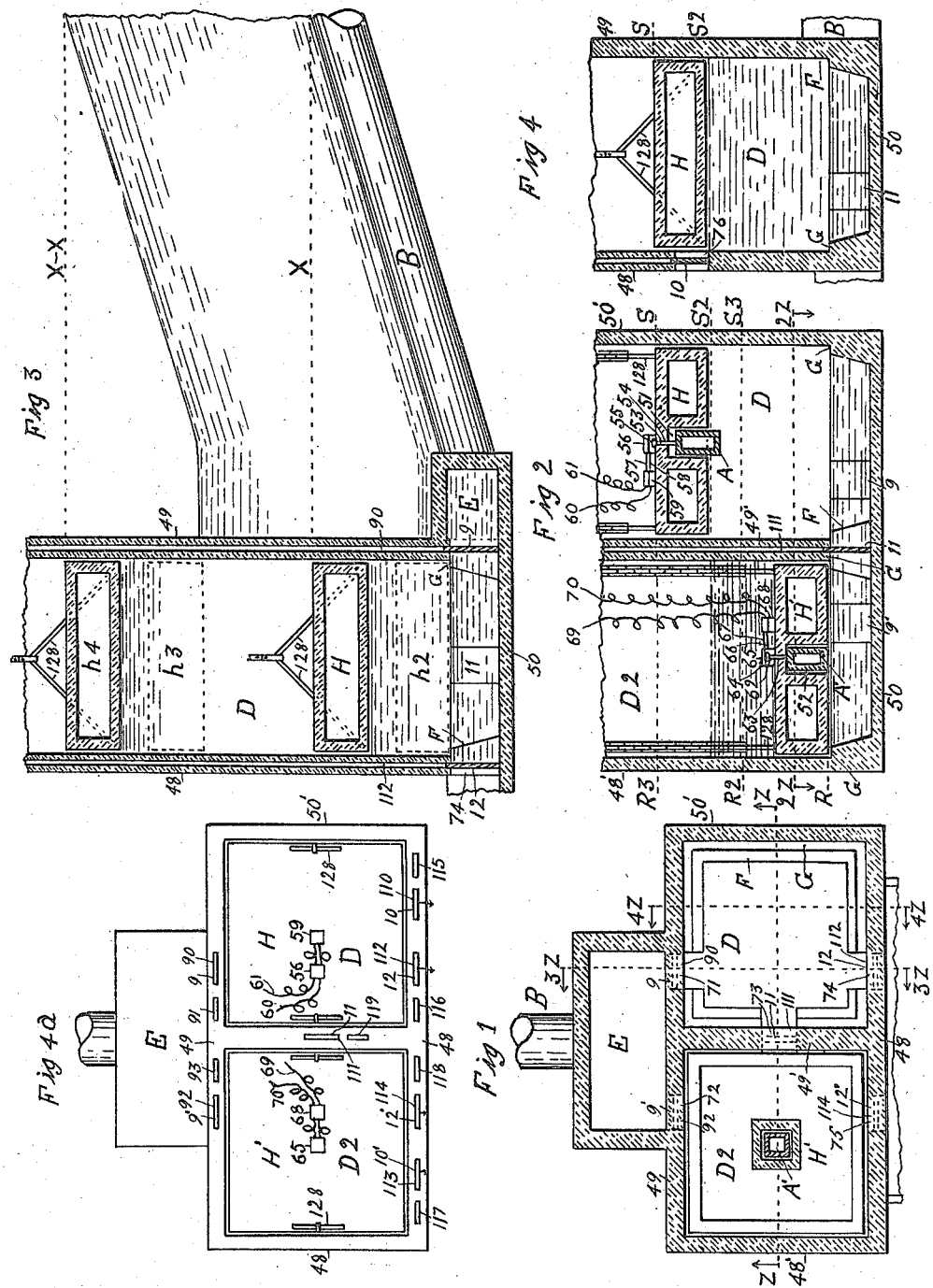

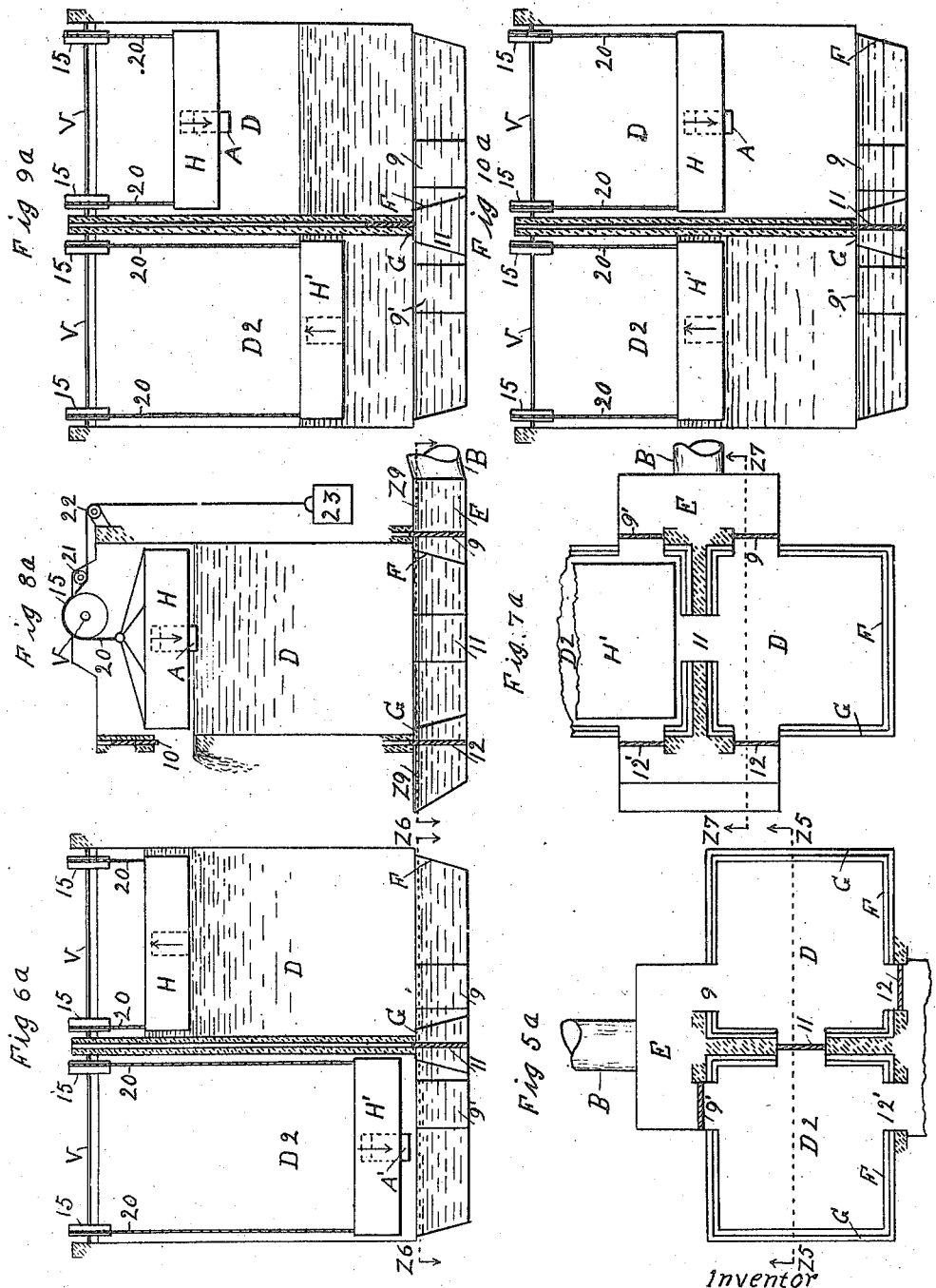

T. BIRD.
COMBINATION WATER AND WEIGHT POWER MACHINE.
APPLICATION FILED AUG. 4, 1917.
1,264,759.
Patented Apr. 30, 1918.
4 SHEETS—SHEET 4.
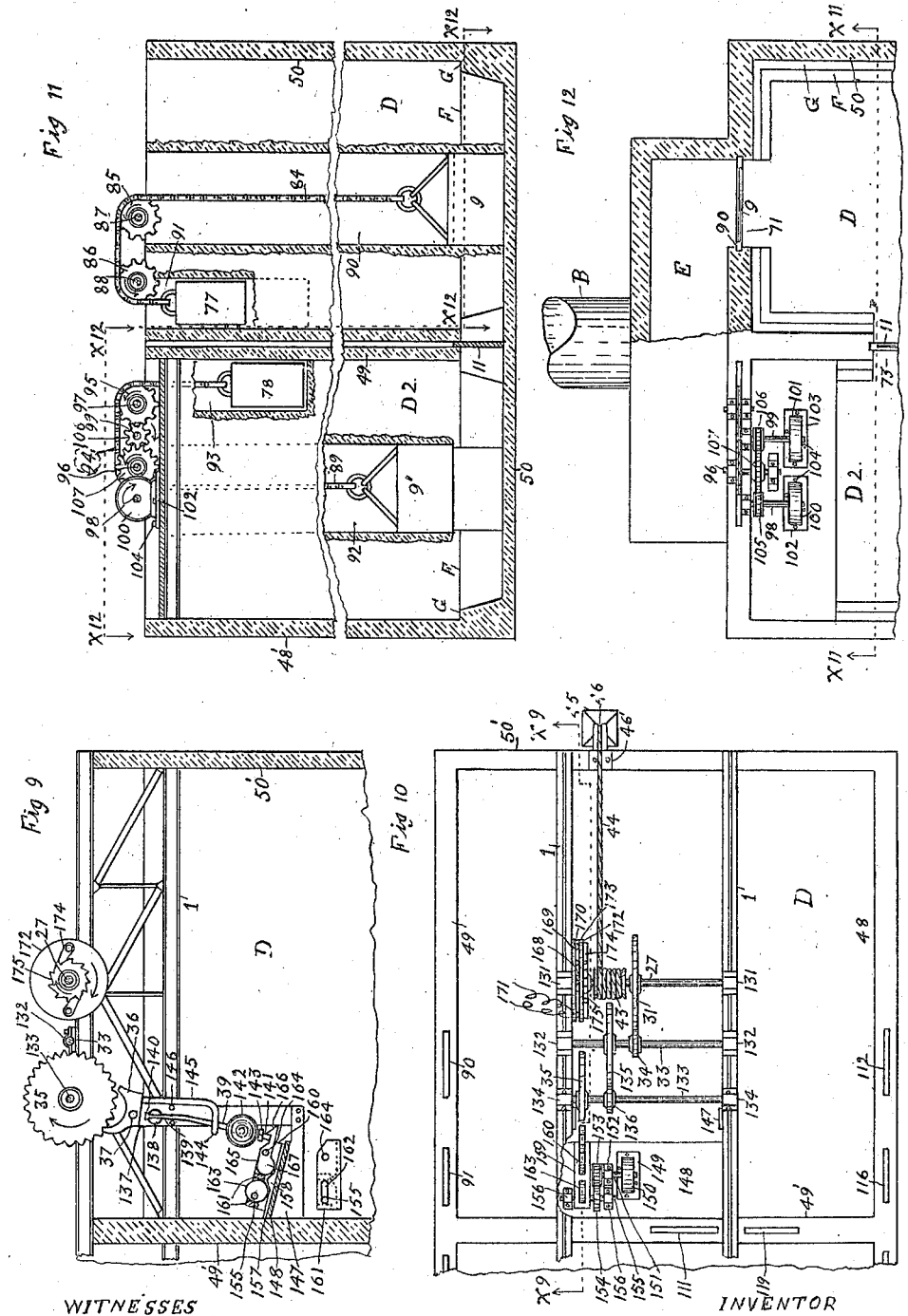
WITNESSES
John A. Morris
Melker Rudholm
INVENTOR
Thomas Bird
BY James R. Townsend
ATTORNEY

UNITED STATES PATENT OFFICE.

THOMAS BIRD, OF SAWTELLE, CALIFORNIA.

COMBINATION WATER AND WEIGHT POWER MACHINE.

1,264,759.	Specification of Letters Patent.	Patented Apr. 30, 1918.

Application filed August 4, 1917. Serial No. 184,527.

*To all whom it may concern:*

Be it known that I, THOMAS BIRD, a citizen of the United States, residing at Sawtelle, in the county of Los Angeles and State of California, have invented a new and useful Combination Water and Weight Power Machine, of which the following is a specification.

My invention relates to devices in which the power developed by water and weight is utilized.

In my former invention of a power device, for which Letters-Patent of the United States No. 999198, were issued to me on Aug. 1, 1911, I provided a compartment in which a float weight was caused to rise by the tides, and the power derived from the gravity movement of said float weight was utilized for developing a constant power adapted for practical purposes.

The main object of this invention is to utilize the movement of float weights in tanks, from which a supply pipe may be extended alongside of and upwardly into a large, navigable river, or other navigable body of water, without interfering with the navigation thereof, for the purpose of producing a constant power therefrom, or the supply pipe may be extended up into a stream or any other body of water having a slight fall sufficient to cause a water head to generate power. The present invention thus comprises a device supplied with water from any one of such sources, and is composed of two square tanks which are preferably of the same size and may be of any required height and area and placed on a common level. The tanks are joined side by side so that they form a unit, and each tank in provided with a float weight which is vertically movable therein and adapted to ascend with the rising water and to descend by gravity. Suitable machinery from which the respective float weights are suspended is provided above the tanks, and the water is admitted into the tanks and discharged therefrom by means of gates in such a manner that the discharge of the water from one tank leaves a void space in the tank below the float weight therein, thus causing the descent of the float weight by gravity. The descent, which is controlled by a governor mechanism, transmits motion to said machinery from which through suitable means, power is generated for use wherever and whenever required.

Said object and other advantages of the invention are set forth in the subjoined detail description, the accompanying drawings and the appended claims.

This application contains subject-matter set forth in my application for combination water and weight power machine, filed by me April 18, 1916, Serial No. 92057, and as to the matters disclosed in said application is a continuation of said application.

The accompanying drawings illustrate the invention.

Figure 1 is a sectional plan view of the device on the line $2^z$—$2^z$ of Fig. 2, and shows the tanks, the float weight in one of the tanks, gates, and the water supply pipe.

Fig. 2 is a sectional elevation on the line Z—Z of Fig. 1, and shows the tanks, the float weight in each tank, the gate between the tanks, and the buoyant floats that control the pendulum.

Fig. 3 is a sectional elevation on the line $3^z$—$3^z$ of Fig. 1, and shows one of the tanks, the float weight therein, some of the gates, the inlet to the tank and the water supply pipe. It serves to illustrate how the supply pipe may be extended alongside of and upwardly into a large, navigable river, without interfering with the navigation thereof, and the effect upon the float weight of the water rising in the river from which the water supply is taken.

Fig. 4 is a sectional elevation on the line $4^z$—$4^z$ of Fig. 1, and shows one of the tanks having the float weight therein raised to the level of the upper discharge gate, the opening of which will cause the descent of the float weight when the governor mechanism is started.

Fig. $4^a$ is a plan view of the tanks and shows the rectangular gates and counterweights and the rectangular receptacles therefor, the tops of the float weights, and the lifts for the float weights.

Fig. 5 is a plan view of the device and shows one of the float weights and the mechanism from which it is suspended.

Fig. 6 is a sectional elevation on the dotted line R—R of Fig. 5.

Fig. 7 is a sectional elevation on the dotted line O—O of Fig. 5.

Fig. 8 is a fragmental sectional elevation of one of the tanks, and serves to illustrate details of the governor mechanism.

Fig. 9 is a sectional elevation of the top of one of the tanks on the line $x^9$—$x^9$ of Fig. 10, and shows the governor mechanism and the stop means therefor; the ratchet wheel operating the disk whereby all electrical contacts of the device are effected; the hollow shaft for the disk; and one of the walls of the frame structure that holds the rocking catch member for stopping the pendulum is also shown separately below the other mechanism in order to illustrate the oblong slot, which holds therein the shaft for the eccentric disk.

Fig. 10 is a plan view of one of the tanks, and serves to illustrate the electrical contacting means on the top of the tank.

Fig. 11 is a sectional elevation of the tanks on the line $x^{11}$—$x^{11}$ of Fig. 12, and shows two of the gates and their respective counterweights, and the motor-driven mechanism therefor on the top of the tank, only one motor being shown, and serves to illustrate the operation of the gates in general.

Fig. 12 is a broken and partly sectional plan view of the device on the line $x^{12}$—$x^{12}$ of Fig. 11, and shows the motors on the top of one of the tanks, one of the gates, and how one gate-operating mechanism is connected with the motors.

Figs. $5^a$, $6^a$, $7^a$, $8^a$ and $10^a$ are partly sectional illustrations, diagrammatic in character, and serve to show the float weights and the gates in the various stages of the cycle, the arrows on the float weights indicating the directions in which the float weights are traveling. Of these figures, Fig. $5^a$ is a fragmental plan view of the tanks, on the dotted line $Z^6$—$Z^6$ of Fig. $6^a$.

Fig. $7^a$ is another fragmental plan view of the tank on the dotted line $Z^9$—$Z^9$ of Fig. $8^a$.

Figs. $6^a$, $9^a$ and $10^a$ are elevations of the tanks on the dotted line $Z^5$—$Z^5$ of Fig. $5^a$, and Fig. $8^a$ is an elevation on the dotted line $Z^7$—$Z^7$ of Fig. $7^a$.

Like numerals and letters refer to like parts throughout the views.

My invention comprises two square, upright tanks D and $D^2$ which are preferably constructed of concrete or a similar material. The tanks have open tops and are of the same size and joined side by side so that they form a unit having a partition wall 49', two parallel, elongated side walls 48 and 49, two end walls 48' and 50' and a bottom 50, the elongated side walls 48 and 49 being of approximately double the area of the end walls 48' and 50'. Approximately midway between the end walls 48' and 50' the tanks D and $D^2$ have an outward extension chamber E integral with the bottom 50 and the elongated side wall 49. This extension chamber E is connected with a continuous conduit B which in Fig. 3 is shown as extending up a river, although it may lead to a lake, reservoir, or any other suitable body of water having a slight fall capable of producing a water head for the generation of power. The tanks D and $D^2$ are provided with a buttress F which is integral with the bottom 50, the walls 48, 48', 49, 49' and 50', and has at its top abutting edges or shoulders G. Through the buttress F and through the side walls 49 are passageways 71 and 72 respectively communicating with the tanks D and $D^2$ from the extension chamber E, and the passageways 71 and 72 are respectively provided with closures or gates 9, 9', which gates are vertically movable in respective receptacles 90, 92, and thus control the inflow of water to the tanks D and $D^2$, so that when the gates are opened the water from the water source flows through the conduit B, the extension chamber E, the passageways 71 and 72, into the tanks D and $D^2$ respectively.

Two float weights H and H', preferably of the same material as the tanks and conforming to the interior shapes thereof, are provided, the float weight H being vertically movable in the tank D and, whether the river is rising or falling, being also adapted to stop its descent by contacting with the water at a level of or a short distance above the shoulders G. Analogously to the float weight H in the tank D, the float weight H' is vertically movable in the tank $D^2$, and its descent is also stopped by the float weight's contact with the water at the same level as in the tank D. Thus, when water enters the tanks through the respective passageways 71 and 72, the float weights will ascend with the rising water until the gates 9 and 9' are lowered in their respective receptacles 90 and 92, thereby closing the respective passageways 71 and 72 and preventing inflow of water to the tanks.

The float weight H is centrally provided with a square chamber 51 which opens toward the under side of the float weight, and a corresponding chamber 52 is in a similar relation to the float weight H'. A buoyant float A provided with a rod 53 which is integral therewith and extends upwardly through an opening 54 in the top of the float weight H, is adapted to move vertically in the chamber 51, and has above the float weight H, as shown in Fig. 2, a cap or button 55 of insulating material and securely fastened to the rod 53. On the top of the float weight H is an insulating block 56 having thereupon a contact spring 57 insulated from another contact spring 58 by an insulating block 59, and wires 60 and 61 are respectively connected with the contact springs 57 and 58 and lead therefrom to a dynamo or generator of electrical energy, not shown, for purposes hereinafter explained. The chamber 52 in the float weight H' is similarly provided with a buoyant float A' which has integral therewith a rod 62 extending upwardly through an opening 63 in the top of the float weight H', and securely fastened to the rod 62 above the float weight H' is a cap or button 64 of insulating material. On the top of the float weight H' is an insulating block 65 having thereupon a contact spring 66 insulated from another contact spring 67 by an insulating block 68, and wires 69 and 70 are respectively connected with the contact springs 66 and 67 and lead therefrom to the same dynamo as the wires 60 and 61 relating to the float A in the float weight H. The springs 57 and 58 and their respective wires 60 and 61 on the top of the float weight H, and the springs 66 and 67 with their respective wires 69 and 70 are diagrammatically represented, and the fastening for the springs and the insulating blocks to the respective float weights H and H' is not shown, as such arrangement is easily understood by any one skilled in the art. Also, other arrangements of the electrical contacting means for the floats A and A' than that shown and described may be made without departing from the spirit of my invention.

In addition to the inlet gates 9 and 9' the tanks D and D² are also provided with five rectangular outlet gates 10, 10', 11, 12 and 12'. Of these outlet gates the gate 11 is arranged to move vertically in a rectangular recess 111 and is normally adapted to form a closure at the bottom 50 for a central passageway 73 through the buttress F and the wall 49' between the tanks D and D². The gate 12 moves vertically in a rectangular recess 112 in the wall 48 and is normally adapted to form a closure at the bottom 50 for a passageway 74 opposite to the passageway 71 and leading from the tank D through the buttress F and the wall 48 to the outside of the tank. Similarly, in the tank D² the gate 12' moves vertically in a rectangular recess 114 in the wall 48 and is normally adapted to form a closure at the bottom 50 for a passageway 75 opposite to the passageway 72 and leading from the tank D² through the buttress F and the wall 48 to the outside of said tank. The same wall 48 has also a rectangular recess 110 in which the gate 10 moves vertically and normally provides a closure, as shown in Fig. 4, for the passageway 76 leading from the tank D through the wall 48 at the upper part of the tank to the outside thereof. The tank D² has a passageway, not shown, but leading in a similar manner as the passageway 76 through the wall 48 to the outside of the tank and being normally adapted to be closed by the gate 10' which moves vertically in the rectangular recess 113, shown only in Fig. 4ª.

For the convenience of description, the water is hereinafter referred to as flowing through a gate when the meaning is that the water flows through the passageway controlled by the respective gate. The water flowing, for example, through the passageway 71 will be spoken of as flowing through the gate 9, which is the gate that controls said passageway.

The gates have counterweights therefor which are vertically movable in suitable receptacles 91, 93, 115, 116, 117, 118, and 119, alined with the receptacles 90, 92, 110, 112, 113, 114 and 111, for the respective gates. A plan view of all the receptacles is shown in Fig. 4ª.

As shown in Fig. 11, the gate 9 in the receptacle 90 is at its upper end attached to one end of a sprocket chain 84 which passes over and engages sprocket wheels 85 and 86 respectively mounted in alinement upon rotating shafts 87 and 88 on the top of the tank D, and the other end of the chain 84 is attached to the upper end of the counterweight 77 in the receptacle 91. Similarly, the gate 9' in the receptacle 92 is at its upper end attached to one end of a sprocket chain 89 which passes over and engages sprocket wheels 94 and 95 respectively mounted in alinement upon rotating shafts 96 and 97 on the top of the tank D², and the other end of the chain 89 is attached to the upper end of the counterweight 78 in the receptacle 93. The connecting mechanism and the motor which impart motion to the two sprocket wheels 85 and 86 for raising or lowering the gate 9 whereby the inflow of water to the tank D is controlled, are not shown, as their arrangement is similar to the arrangement of the connecting mechanism and the motors which impart motion to the two sprocket wheels 94 and 95 for the operation of the gate 9' controlling the inflow of water to the tank D². As shown in Figs. 11 and 12, the respective motor shafts 98 and 99 of two motors 100 and 101 having their bases 102 and 103 firmly secured to the top of the tank D² by bolts 104, are provided with pinions 105 and 106 which mesh into the intermediate wheel 107 fastened upon the rotating shaft 96 so that the rotary motion of the motors 100 and 101 is transmitted to the sprocket wheel 94 and thence by means of the sprocket chain 89 to the gate 9'. The motors 100 and 101 are so arranged and connected in the circuit with the aforementioned dynamo that one motor is idle or shut off from the circuit while the other motor is operative. For example, if the motor 100, representing the motor that effects the raising of the gate 9', is in the circuit, it will rotate in the direction indicated by the curved arrow thereon in Fig. 11, while the intermediate gear wheel 107 will rotate in the direction indicated by the curved arrow on the gear wheel, and the motor 101, being shut off from the circuit, will rotate in the direction opposite to the direction indicated by the curved arrow placed outside of the pinion 106 upon the shaft 99 for said motor, the direction of the motor 101 being the same as the direction indicated for the motor 100. On the contrary, if the motor 101, representing the motor that effects the lowering of the gate 9' is in the circuit, it will rotate in the direction indicated by the curved arrow outside of the pinion 106, while the intermediate gear wheel 107 will rotate in the direction opposite to the direction indicated by the curved arrow on the gear wheel, and the motor 100, being then shut off from the circuit, will rotate in the direction opposite to the direction indicated by the curved arrow thereon, or in the direction opposite to the direction for raising the gate 9'. The other gates being operated in a manner similar to that of the operation of the gates 9 and 9', the respective operative mechanism of the other gates is not shown, and it is understood that the operation of the gates is not restricted to the particular mechanism shown and described but that any other means may be employed therefor within the scope of this invention.

A main shaft V extends longitudinally above the tanks through alined bearings 13 which are secured to bearers 14, one bearer 14 being arranged as an upwardly extending part of the wall 49' between the tanks D and D², one bearer 14 being arranged as an upwardly extending part of the wall 50', and one bearer 14 being placed intermediate the walls 49' and 50' upon two parallel truss frames 1 extending above the tank D and being secured to said walls. Similarly, one bearer 14 is arranged as an upwardly extending part of the wall 48' for the tank D², the bearer part 14 of the wall 49' serving also for the tank D², and one bearer 14 being placed intermediate the walls 48' and 49' upon two parallel truss frames 1 which extend above the tank D² and are secured to the last-named wall in alinement with the truss frames 1 above the tank D. The arrangement of the parts relative to the mechanism above the tanks D and D² operated by the respective float weights H and H' therein, is the same for both tanks, so that the description relative to the mechanism above the tank D applies also to the mechanism above the tank D². For the sake of conciseness, therefore, only the mechanism above the tank D, as shown in Figs. 5, 6, 7, and 8, will be here described, the only difference in the arrangement of the two mechanisms being that outside of the wall 50' of the tank D a gear wheel 47, adapted to transmit power, is rigidly secured to the shaft V, although, of course, another wheel 47 could similarly and for the same purpose be placed upon the shaft V outside of the wall 48' of the tank D², or a number of wheels 47 could be arranged on the shaft V in convenient places in order to transmit power to a corresponding number of dynamos.

Bearers 2, adapted to support bearings 17 in alinement with the bearings 13, are also secured to the truss frames 1 in addition to the bearers 14, and the bearer parts 14 of the walls 49' and 50' also support such bearings 17 in alinement with the other bearings 13. The bearings 17 are sufficiently large to receive therein the axle ends 3 and 4 of a composite wheel 15, there being one such composite wheel 15 thus provided at and above each wall 49' and 50' for the tank D. Each composite wheel 15 is made in two parts, one part comprising a hollow axle 5 having integral therewith at the end opposite to the end 3 a conical head 6 which terminates in a flat annular flange 7. The other part of the composite wheel 15 comprises a conical head 8 integral with the axle end 4 and terminating in the annular rim 108, in the side of which opposite to the conical head 8 is an annular recess 109 adapted to receive therein the flange 7 of the conical head 6, and bolts 16 are employed for rigidly securing the flange 7 to the rim 108, so that the hollow axle 5 with its end 3 is in alinement with the axle end 4 in the completed wheel 15. A hollow space 120 is in this manner formed within the composite wheel 15, and an annular space 121 is also provided from the end 3 to the end 4 between the main shaft V and the wheel 15, so that said wheel is adapted to rotate without contacting with the main shaft V, thereby greatly reducing the frictional resistance of the device. The annular rim 108 is internally provided with a ratchet gear 122, and pawls 19 are mounted on pivots 123 in seats 124 centrally upon the periphery of a wheel 18 which is rigidly secured to the shaft V in such a position that the pawls 19 engage the teeth of the ratchet wheel 122. The outer periphery of the rim 108 is provided with a worm gear 125 and a sprocket wheel 126, there being an annular space 127 between the worm gear and the sprocket wheel, and one end of a sprocket chain 20 is secured to a lift 128 arranged centrally at the side and the top of the float weight H in vertical alinement with the sprocket wheel 126, the two sprocket chains 20 and the two respective lifts 128 thus provided being adapted to move in unison and to hold the upper and lower surfaces of the float weight H in a level position. From the lift 128 the sprocket chain 20, first passing over the sprocket wheel 126, passes under a sheave 21 and thence over a sheave 22 which is pivoted in a suitable support 129 extending some distance beyond the wall 49, and the chain 20 is at its end below the sheave 22 secured to a weight 23.

Rotating in bearings 130, which are secured to the tops of the truss frames 1, is a transverse shaft 24 placed vertically above the center of the worm gear 125 and having thereupon a worm pinion 25 in engagement with the worm gear 125, and a sprocket pinion 26 is also securely fastened upon the shaft 24 near one end thereof. Above the tank D, near the center thereof, is a transverse governor shaft 27 which rotates in bearings 131, also secured to the top of the truss frames 1, and two sprocket wheels 28 are placed upon this shaft 27 in alinement with the respective sprocket pinions 26, which are respectively held in engagement with the sprocket wheels 28 by means of endless sprocket chains 29. Near the center of the shaft 27 the shaft has a ratchet pinion 30 securely fastened thereupon, and side by side of the ratchet pinion is a gear wheel 31 rotatable upon the shaft 27 and having pawls 32 pivoted upon one side in positions for engagement with the ratchet pinion 30. Upon the shaft 27, between the innermost of the sprocket wheels 28 and the ratchet pinion 30, is a spool 40 securely fastened, and a wire rope 41, which has its upper end fastened to the spool 40, coils around said spool and has at its lower end a weight 42 secured thereto. Upon the same shaft 27, between one of the bearings 131 and the gear wheel 31, is another spool 43 securely fastened, and a wire rope 44, which has one end fastened to the spool 43, coils around the spool in a direction reverse to that of the wire rope 41 on the spool 40 and passes from the underside of the spool 43 to and over a sheave 46, which is pivoted in a suitable support 46′, and below the sheave 46 the wire rope 44 has its end attached to a weight 45 suitably lighter than the weight 42.

A shaft 33, in proximity to and parallel with the shaft 27, is rotatably mounted in bearings 132 secured to the tops of the truss frames 1, and farther away from the shaft 27 than the shaft 33 is another shaft 133 parallel with the other shafts 33 and 27 and likewise mounted in bearings 134 secured to the tops of the truss frames 1. A pinion 34 secured to the shaft 33 engages the gear wheel 31 on the shaft 27, and another gear wheel 135 secured to the shaft 33 near the pinion 34 engages a pinion 136 secured to the shaft 133, so that the respective gears and pinions 31, 34, 135 and 136 constitute a train of gears whereby rotary motion is imparted to the shaft 133 from the rotating shaft 27. An escapement wheel 35 is securely fastened upon the shaft 133 in proximity to one of the bearings 134, and an anchor 36, provided with two pallets 38 which are adapted to engage the teeth of the escapement wheel 35, is mounted upon a pivot 37 below said escapement wheel, the pivot 37 being held in position by a support 137 suitably secured to the truss frames 1. The support 137 has also suitably secured thereto below the pivot 37 a slotted stud 138 adapted to hold therein the upper, flat spring part 139 of a pendulum 39, this pendulum being prevented from slipping out of said stud 138 by suitable means, for instance, an upset termination 140 above the stud 138, as shown in Figs. 8 and 9. Upon the pendulum 39, near the lower end 141 thereof, is slidably secured a pendulum bob 142 which has below it a nut 143 upon the pendulum for vertical adjustment thereupon. A yoke 144, loosely embracing and holding the pendulum 39 therewithin at a suitable place between the stud 138 and the bob 142, has an upwardly extending straight stem 145 secured to the underside of the anchor 36, so that by means of the yoke 144 an oscillating motion is imparted to the pendulum 39 from the escapement wheel 35 through the anchor 36, and a mechanism is provided for governing the descent of the float weight H in the tank D. Pins 146 are also provided upon the support 137 on both sides of the pendulum 39 in order to prevent too great an oscillating movement of the pendulum, which movement may be injurious, especially to the escapement of the mechanism.

A bracket 147 having a downwardly inclined upper surface 148, shown in Figs. 9 and 10, is suitably supported by the wall 49′ and the truss frames 1, and the base 149 of a motor 150 is secured to the inclined surface 148, said motor being connected in circuit with the aforementioned dynamo by the wires 60 and 61 on top of the float weight H and also by other wires hereinafter mentioned. The shaft 151 of the motor 150 is parallel with the shaft 133 and extends from the motor into a bearing 152 which is secured to the inclined surface 148, and a pinion 153 is firmly secured to the shaft 151 outside of the bearing 152. A gear wheel 154, in mesh with the pinion 53, is fastened upon another shaft 155 parallel with the shaft 151 and rotatable in bearings 156 fastened upon the inclined surface 148 near the wall 49′. A rectangular plate 157 extending from the wall 49′ in proximity to one of the truss frames 1, is fastened to the inclined surface 148 and has upon its upper surface approximately midway between its ends a lug 158. A frame structure 159 comprising two longitudinal walls 160 which are joined at their upper edges by cross bars 161 and at their lower edges embrace the longitudinal edges of the plate 157, is slidably mounted upon the inclined surface 148. An oblong slot 162 parallel with the inclined surface 148 is provided in each of the walls 160 between the cross bars 161. The shaft 155 extends through these slots 162, which register with each other, and has secured upon it between the walls 160 an eccentric disk 163, the cross bars 161 being spaced apart sufficiently to allow rotation of the disk 163 therebetween. Away from the wall 49' the frame structure 159 has transversely secured thereto a pivot 164 for pivotally supporting thereupon between the walls 160 a rocking member 165 which is toward the end 141 of the pendulum 39 provided with a catch 166 and at the other end toward the eccentric disk 163 provided with a weight 167 for overbalancing the catch and normally holding it in a raised position, so that when the motor 150 has revolved sufficiently, the disk 163 is in the position shown in Fig. 9, thereby pushing the frame structure 159 down upon the inclined surface 148, until the catch 166 of the rocking member 165 is forced into the path of the pendulum 39 and locks the same near the extremity of its oscillation toward the wall 49'.

The bearing 131 nearest to the spool 43 upon the shaft 27 has integral therewith and extending toward said spool a hollow shaft 168 which is concentric with the shaft 27 but preferably not in contact therewith, and a disk 169 is firmly fixed to the hollow shaft 168 and thus held in stationary relation to the shaft 27. This stationary disk 169 is on its surface toward the spool 43 provided with a number of circularly arranged insulated push contacts 170, of which only three are shown in Fig. 10, and wires 171 leading from said contacts are connected in circuit with the respective motors that are operated by the electric current from the aforementioned dynamo. A disk wheel 172 rotatably mounted upon the hollow shaft 168 adjacent to the disk 169, has also on its surface toward the disk 169 a number of suitable circularly arranged projections 173 which are spaced apart for pushing the push contacts on the disk 169 whenever it is required to connect any of the motors with the electric circuit. Pawls 174, pivotally mounted on the side of the disk wheel 172 toward the spool 43, are adapted to engage the teeth of a ratchet wheel 175 which is firmly fixed to the shaft 27 at the side of the disk wheel 172 and the free end of the hollow shaft 168.

It will be noted that when the float weight H descends in the tank D a rotary motion is transmitted to the main shaft V in the direction indicated by the curved arrow applied below the composite wheel 15 in Fig. 7. Simultaneously therewith the weight 42 causes the shafts 24 and 27 to rotate in the direction indicated by the curved arrow upon the sprocket wheel 28 in Fig. 6. The pawls 32 on the side of the gear wheel 31 are then forced into operative engagement with the teeth of the ratchet pinion 30, and the pawls 174 upon the disk wheel 172 are similarly forced into operative engagement with the teeth of the ratchet wheel 175, thereby causing the gear wheel 31 and the disk wheel 172 to rotate in the same direction as the shaft 27, while when the float weight H and with it the weight 42 is ascending, the descending weight 45 will cause the shafts 27 and 24 to rotate reversely to their aforementioned direction, so that the pawls 32 and 174 are free to slide over the ratchet pinion 30 and the ratchet wheel 175 respectively, and the gear wheel 31 and the disk wheel 172 thus will remain stationary relative to the shaft 27.

It will also be noted that the electric contacting means for the disk wheel 172 and the disk 169 is not here described in detail as the construction of such contacts is well known and can be easily accomplished by any one skilled in the art to which this invention refers.

The operation of my device is as follows:—

When the gate 9 is open, and before the gate 12' is closed, as shown in Fig. 5ª, the water from the water source flows through the conduit B, the extension chamber E and the gate 9 into the tank D under the float weight H and causes the float weight to rise therewith from its position $h^2$, as shown by dotted lines in Fig. 3, upon or a short distance above the abutting edges G of the buttress F. In the meantime the float weight H' in the tank $D^2$ is descending, thereby causing a rotary motion of the main shaft V and the wheel 47, which connects with the aforementioned dynamo, and the weight 42 also descends, thereby causing the operation of the governor mechanism over the tank $D^2$, which mechanism includes the disk wheel 172 and the stationary disk 169.

When thus the float weight H reaches the position indicated by S in Figs. 2 and 4, S being the level the water displaced by the float weight H in the tank D has assumed, a projection 173 on the disk wheel 172 of the governor mechanism above the tank $D^2$ contacts with a push contact 170 on the stationary disk 169, which contact 170 through the wires 171 connects a motor, similar in action to the motor 101 shown in Fig. 12 for the gate 9', with the dynamo circuit and thereby effects the closing of the gate 9 in the tank D so that the inflow of water to the tank D is stopped.

As the disk wheel 172 continues to revolve, the contact that effects the closing of the gate 9 lasts only for a moment, and the motor 101 is therefore shut off from the circuit and inoperative when the gate 9 is closed. In the next instant a second projection 173 contacts with a second push contact 170, and through similar wires 171 connects a motor 100, analogous to the motor 100 for the gate 9', with the dynamo circuit as before and thereby opens the gate 10 so that some of the water in the tank D flows out therethrough and the water falls from the displacement level S to the true level indicated by $S^2$ in Figs. 2 and 4. A void is in this manner caused below the float weight H in the tank D, and the float weight H is held suspended by the sprocket chains 20 in the position it has attained, the weights 23 having taken up the slack of the chains during the ascent of the float weight. The relative positions of the float weights in this stage of their cycle are clearly illustrated in Fig. $6^a$, in which the float weight H is diagrammatically shown at the extremity of its upward movement while the float weight H' is similarly shown as nearing the extremity of its downward movement, and in Fig. $8^a$, which shows how the water is flowing out of the tank D through the open gate 10 and in assuming the aforementioned level at $S^2$ causes the void below the float weight H.

The void so produced in the tank D represents a comparatively short distance between the water level and the bottom of the float weight, approximately about one inch, and is also determined by the electric contacts of the governor mechanism above the tank $D^2$. In this instance, as the aforementioned disk wheel 172 of said mechanism continues to revolve, a third projection 173 comes in contact with a third push contact 170, and through a third pair of dynamo-connecting wires 171 starts a similar motor 101 and effects the closing of the gate 10 when the water level $S^2$ is reached. The gate-closing motor 101 for the gate 10, of course, stops its operation as soon as the third projection 173 has passed the third contact 170.

Immediately thereafter and immediately before the descending float weight H' has reached the water level indicated by R at or a short distance above the buttress shoulders G in the tank $D^2$, a fourth projection 173 on the disk wheel 172 contacts with a fourth push contact 170 on the stationary disk 169. This operation, through a fourth pair of dynamo-connecting wires 171 leading to the motor 150, imparts motion to said motor so that the eccentric disk 163 is turned to a position reverse to that shown in Fig. 9, and the frame structure 159 is pulled up the inclined surface 148 until the weight 167 of the rocking member 165 strikes the lug 158 and forces the catch 166 to release its grip upon the pendulum 39, thereby starting the governor mechanism over the tank D and causing the descent of the float weight H therein.

The float weights H and H' are thus descending in their respective tanks D and $D^2$ at the same time, but only for a moment, for in the next instant the buoyant float A' comes in contact with the water at the level indicated by R and is forced into its chamber 52 in the float weight H'.

In the meantime the disk wheel 172 of the governor mechanism above the tank D revolves so that a projection 173 thereon contacts with a contact 170 and through a pair of wires 171 connected with the wires 69 and 70 on the top of the float weight H' effects the connection of the motor 150 above the tank $D^2$ with the dynamo circuit as soon as the buoyant float A' has risen to the top of the chamber 52. The respective eccentric disk 163 operated by said last-named motor 150 is then turned to the position shown in Fig. 9. In the next instant the disk wheel 172 of the governor mechanism above the tank D is turned so that the projection 173 has passed the contact 170, and the motor 150 is shut off from the circuit. The pendulum 39 of the governor mechanism above the tank $D^2$ is thus held in locked position until it is again released by the electrical means of the governor mechanism for the tank D.

A moment thereafter a second projection 173 of the governor mechanism above the tank D contacts with a second push contact 170 on the stationary disk 169, and through a second pair of wires 171 connects the motor 100 for the gate 11 with the dynamo circuit. The gate 11 thus opens and allows a portion of the water remaining in the tank D to flow therethrough into the tank $D^2$ until the water assumes a common level in both tanks, the level being in Fig. 2 indicated by $S^3$ in the tank D and by $R^2$ in the tank $D^2$, and the gate 11 being shown open in Fig. $7^a$. The water so acting causes the float weight H' to rise therewith in the tank $D^2$ to the common level, as is shown in Fig. $9^a$.

Immediately thereafter a third projection 173 on the last-named disk wheel 172 makes contact with a third push contact 170 on its respective stationary disk 169, and through a third pair of wires 171 connects the motor 101 for the gate 11 with the dynamo circuit, so that the gate 11 is again closed. Before the descending float weight H in the tank D reaches the new water level at $S^3$, the float weight being shown in this stage of its cycle in Fig. $9^a$, a fourth projection 173 contacts with a fourth push contact 170 and through a fourth pair of wires 171 connects the motor 100 for the gate 12 in the circuit with the dynamo. The gate 12 then opens and allows the water in the tank D to flow therethrough, thereby completing the void below the float weight H for its descent in the tank D. It should be observed, however, that a moment before the water thus flowing out of the tank D has reached the level R, a fifth projection 173 of the last-mentioned revolving disk wheel 172 contacts with a fifth push contact 170 on the respective stationary disk 169, and through a fifth pair of wires 171 connects the motor 101 for the gate 12 with the dynamo circuit and thereby causes the closing of the gate 12. In this manner there is retained in the tank D a quantity of water sufficient to reach to the level of the abutting edges G of the buttress F so that when the float weight H has descended to this level the float A is forced to the top of its chamber 51.

Before the float weight H has completed its descent in the tank D a sixth projection 173 of the governor mechanism above the tank D contacts with a sixth push contact 170 and through a sixth pair of wires 171 connects the motor 100 for the gate 9′ in the tank $D^2$ with the dynamo circuit. This action causes the opening of the gate 9′ and allows the water to flow from the extension chamber E into the tank $D^2$ so that the ascent of the float weight H′ is completed. The closing of the gate 9′ and the operation of the gates 10′, 11 and 12′ relative to the tank $D^2$ are thereafter effected in a manner analogous to the operation of the corresponding gates for the tank D, which operation has just been described. Also, the descent of the float weight H′, as well as the action of the water in the tank $D^2$, is thereafter analogous to that of the float weight H in the tank D, so that a detailed description thereof is unnecessary. The alternately ascending and descending float weights, shown in Fig. $10^a$ as passing each other, in this manner impart a continuous rotary motion to the main shaft V, which rotary motion is transmitted by the gear wheel 47 or by a pulley to the dynamo or generator of electrical energy.

It should be remembered, however, that in order to effect this continuous rotary motion of the main shaft V, all electrical connections are made through the projections 173, the push contacts 170 and the wires 171 pertaining to the governor mechanism of the descending float weight. Therefore, when the float weight H in the tank D reaches the level indicated by R, the governor mechanism above the tank is locked by the action of the governor mechanism above the other tank in a manner analogous to that of the locking of the governor mechanism above the tank $D^2$ by the governor mechanism above the tank D, when the float weight H′ in the tank $D^2$ has reached the level R.

While I have thus described the operation of the device having the gates 10, 10′ and 11 therein, it is clear that the device is operable without such gates if the water that operates the device is supplied from a large river or any other great body of water. The advantage of these gates in my device is that by means of them I can apply a portion of the water previously used as an auxiliary force for raising the float weights in the tanks. A device provided with these gates is therefor economical and especially adapted for use in connection with a scant water supply.

If, on the contrary, the water source is great, an overabundance of the water supply cannot drown the power of my device, as is the case with turbines and other water wheels built alongside of streams or rivers. When, for instance, the conduit B is extended up a river, as is shown in Fig. 3, a vertical water head caused by the rising grade of the river bed, is provided in the tank D as shown by the dotted level line X at the inlet of the conduit, this level being the lowest to which the river may fall and still maintain the device in successful operation, and the device having so far been described as operated by water from the river fallen to this level. The water head then has a height sufficient for raising the float weight H from the position $h^2$ indicated by a dotted outline to the dotted level line X. Again, if the water in the river should rise above this level to the level indicated by the dotted line X—X, the water in the tank D will also rise to the new level and cause the float weight H to ascend to the dotted outline position marked $h^4$. Since the descent of the float weight is controlled by the governor mechanism in the manner already explained, and since the motors for the various gates that regulate the water supply in the tanks are controlled by the governor mechanism, the length of the downward path of the float weight is always the same and independent of the height to which the river may rise. For example, when the descending float weight H by means of the buoyant float A is stopped in the dotted outline position marked $h^3$, which represents the lowest position in the vertical descent of the float weight from the position marked $h^4$ at the high level line X—X, the distance between the positions $h^3$ and $h^4$ is the same as the distance between the position $h^2$ and the position of the float weight H at the level line X. This distance is virtually the height of the conduit B, or the distance between the level line X and the buttress shoulders G. It is thus seen that whatever be the level of the river surface, the float weight will ascend only to the height of the water head and descend to the level predetermined by the surface of the water in the tank. Therefore, the height of the water head does not vary with the rise or the fall of the river.

Although I have shown the tanks D and $D^2$ provided with buttresses F having the abutting edges G thereon, these are simply for the purpose of providing a space under the float weights into which space the water will run so that the initial movement of the float weights is thereby facilitated. The buttresses are simply means to strengthen the foundations of the large size tanks, but are otherwise unimportant to the operation of the device and may be dispensed with in tanks which are of a comparatively small size.

It is clear that the dimensions of the device described are determined by the amount of power required, and that the arrangement or the construction of any part or parts thereof can be modified without departing from the spirit of the invention. However, in order to give an idea of the power generated for practical use by means of my device, it may be stated that I have found the strength thereof to be 192.17 horse power when the device is continuously supplied with 10,267.2384 cu. ft. of water a minute, provided that the device is built to reach above the required water head to a point above the possible rise of a river, and that the height of the water head is 13.1416 ft.; the height of each tank from the buttress shoulders also 13.1416 ft.; the area of each tank, 1623.413 sq. ft.; the area of each float weight, 1620.0625 sq. ft.; the displacement of each float weight, 10 ft.; and that each float weight is regulated to descend in thirty seconds the distance of 3.1416 ft. thus available for its vertical travel.

I claim:

1. A power apparatus comprising a plurality of chambers placed on a common level; means to supply liquid to said chambers successively; float weights in said chambers respectively to be lifted by the rising liquid in the respective chambers; mechanism connected to be operated by the descent of the respective float weights; means to successively discharge liquid from a relatively full chamber to a relatively empty chamber and thereby to withdraw liquid support from an elevated float weight in said relatively full chamber and to apply the same liquid to raise a float weight in a relatively empty chamber; and means to withdraw liquid from the relatively empty chamber.

2. A power apparatus comprising a plurality of chambers placed on a common level and arranged to operate in succession; means to supply liquid to said chambers successively; float weights in said chambers to be lifted by the rising liquid in respective chambers; mechanism connected to be operated by the descent of the respective float weights; means to discharge liquid from one chamber into another chamber and thereby to withdraw liquid support from an elevated float weight in the first chamber and apply the same liquid to raise a lower float weight in the second chamber; and means to fully discharge liquid from and retain liquid in said chambers alternately.

3. A power apparatus comprising two chambers placed on a common level, and floats therein adapted to rise and fall responsive to liquid changes in said chambers; float weights in said chambers respectively; mechanism connected to the float weights and adapted to be operated by the descent of the float weights; means for applying liquid from one chamber to raise the float weight in the other chamber, and vice versa, so that the liquid which has raised the float weight in one chamber may be applied to raise the float weight in the other chamber, and vice versa.

4. The combination with a chamber having an outlet at the bottom, of a float weight in said chamber; suspending means connecting said float weight with mechanism to be operated by the descent of the float weight; means to supply liquid to the chamber at the bottom thereof for raising the float weight in the chamber; means operated by the force generated by the descent of the float weight to shut off the supply and to discharge liquid from said chamber, a second chamber communicating with the first chamber and having a float weight therein; means for the second chamber corresponding to those just enumerated, and means whereby the first and second chambers and their weights and means are alternately operated to keep said mechanism in operation.

5. A power apparatus operated by the efficacy of water and weight combined and comprising two tanks, open at their tops and joined side by side so that they form a unit; a float weight vertically movable in each tank and adapted to be raised to the height attained by the water head provided; an inlet connected with the tanks and leading from a water source; gates adapted to admit water from the inlet into the tanks for the purpose of raising the respective float weights therein; gates adapted to discharge water from the tanks and thereby to produce a void in each tank for the descent of the respective float weight therein; gates located between the tanks and adapted to admit water from either of the tanks to the other for slightly raising the respective float weight therein; governor-controlled motors adapted to open or close the respective gates; suspending means for the float weights; means operated by the suspending means for generating power during the descent of the respective float weights; and means for transmitting the generated power from the power apparatus to any other mechanism or place.

6. A power apparatus operated by the efficacy of water and weight combined and comprising two tanks, open at their tops and joined side by side so that they form a unit; a float weight vertically movable in each tank and adapted to be raised to the height attained by the water head provided; an inlet connected with the tanks and leading from a water source; gates adapted to admit water from the inlet into the tanks for the purpose of raising the respective float weights therein; gates adapted to discharge water from the tanks and thereby to produce a void in each tank for the descent of the respective float weight therein; gates located between the tanks and adapted to admit water from either of the tanks to the other for slightly raising the respective float weight therein; governor-controlled motors adapted to open or close the respective gates; a main shaft mounted longitudinally above the tanks; sprocket wheels upon the shaft; means for conveying rotary motion only in one direction to the shaft from the sprocket wheels; sprocket chains passing over and being in engagement with the respective sprocket wheels, one end of each chain being attached to the respective float weight so that the float weights during their descent generate power by acting upon the sprocket chains and wheels and thus rotate the shaft in said direction; and means for transmitting the generated power from the power apparatus to any other mechanism or place.

7. A power apparatus operated by the efficacy of water and weight combined and comprising two tanks, open at their tops and joined side by side so that they form a unit; a gate inlet to each tank at the bottom thereof; and a continuous conduit leading to the gate inlets from a water source above the level of the power apparatus and extending upwardly into the water source such a distance as may be required to produce in the tanks a certain water head which, whether the water source is at its highest or its lowest level, or at one of the intermediate levels it may assume, is always capable of effecting the operation of the power apparatus.

8. A power apparatus operated by the efficacy of water and weight combined and comprising two tanks, open at their tops and joined side by side so that they form a unit; a float weight vertically movable in each tank and centrally provided with a chamber that opens toward the underside of the float weight; a buoyant float normally suspended in each chamber and adapted to rise to the top of the chamber by contact with the water below the float weight or by contact with the bottom of the tank; a generator of electrical energy connected with the power apparatus and operated by the descending float weights; electric motors; switch means for momentarily connecting the electric motors with the circuit of the generator; and governing means operated by the motors for causing the descent of the float weights from their raised positions in the respective tanks.

9. A power apparatus comprising two chambers placed on a common level; means to supply liquid to said chambers alternately; means for discharging liquid from a relatively full chamber to a relatively empty chamber; float weights in the chambers respectively to rise with the rising liquid and to descend in the voids caused by the discharge of liquid from said chambers; means to partly discharge liquid from one chamber to the other chamber whereby liquid is retained in both chambers; and means whereby the liquid retained in either chamber may be used to add to the volume of liquid from the liquid-supplying means for raising a descended float weight in either chamber.

10. In a power apparatus comprising two chambers placed on a common level; means to supply liquid to said chambers alternately from a source, the level of which is above the level of the chambers; means to cause liquid to be discharged from one chamber into the other chamber; and float weights movable vertically in said chambers with the supplied or the discharged liquid.

11. In a power apparatus adapted to be operated by the efficacy of water and weight combined, a plurality of chambers adapted to be supplied with water from a water source; means for shutting off the water from the water source to the chambers; means in each chamber for discharging the supplied water therefrom; means for closing the discharging means; a float weight moving vertically in each chamber, rising with the supplied water and descending in the void caused by the discharge of water from the chamber; means enabling the float weights to rise to the heights of the water source without lessening the efficiency of the power apparatus, whether the water source is at its highest or its lowest level, or at one of the intermediate levels it may assume; and means enabling the float weights to descend a predetermined distance independently of the changing levels of the water source.

12. In a power apparatus supplied with power from a water source, the level of which is above the level of the power apparatus; chambers placed on a common level; float weights adapted to move vertically in the chambers by the action of the water from the water source; a main shaft mounted longitudinally above the chambers; composite wheels for said shaft, each composite wheel comprising two parts so shaped and joined that a hollow space is formed within the composite wheel for reducing the frictional resistance of the power apparatus; means for holding the composite wheels in rotatable relation to the shaft; ratchet means for imparting a rotary motion in one direction from the composite wheels to the shaft; means for connecting the composite wheels with the respective float weights and thereby causing the composite wheels to rotate in said direction; and means for causing an alternate descent of the float weights so that a continuous rotary motion is imparted to the shaft from said composite wheels.

In testimony whereof, I have hereunto set my hand at Los Angeles, California, this 28th day of June, 1917.

THOMAS BIRD.

Witness:
JAMES R. TOWNSEND.

Copies of this patent may be obtained for five cents each, by addressing the "Commissioner of Patents, Washington, D. C."